July 7, 1931.   J. J. NAUGLE   1,813,073
FILTERING MEANS
Filed May 25, 1928   3 Sheets-Sheet 1

INVENTOR.
John J. Naugle
BY Edward M. Evarts
his ATTORNEY.

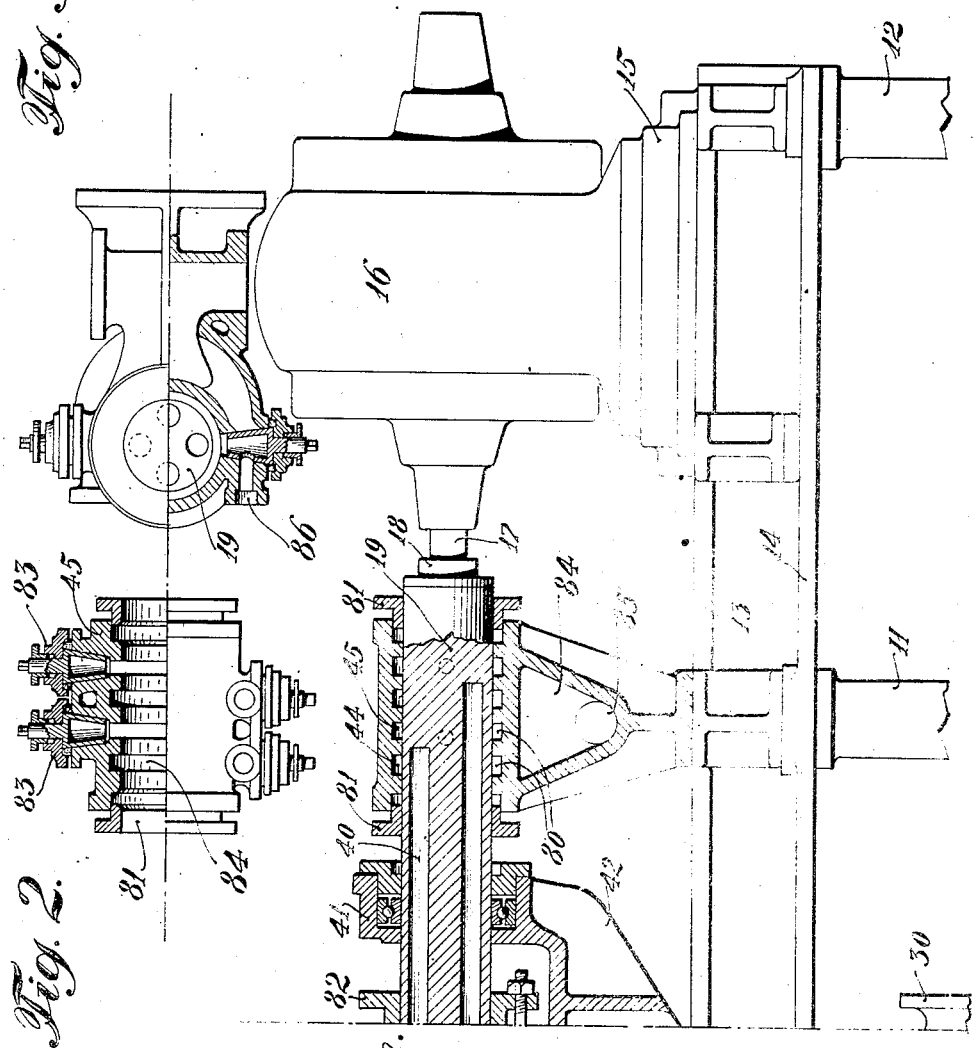

July 7, 1931. J. J. NAUGLE 1,813,073
FILTERING MEANS
Filed May 25, 1928 3 Sheets-Sheet 3
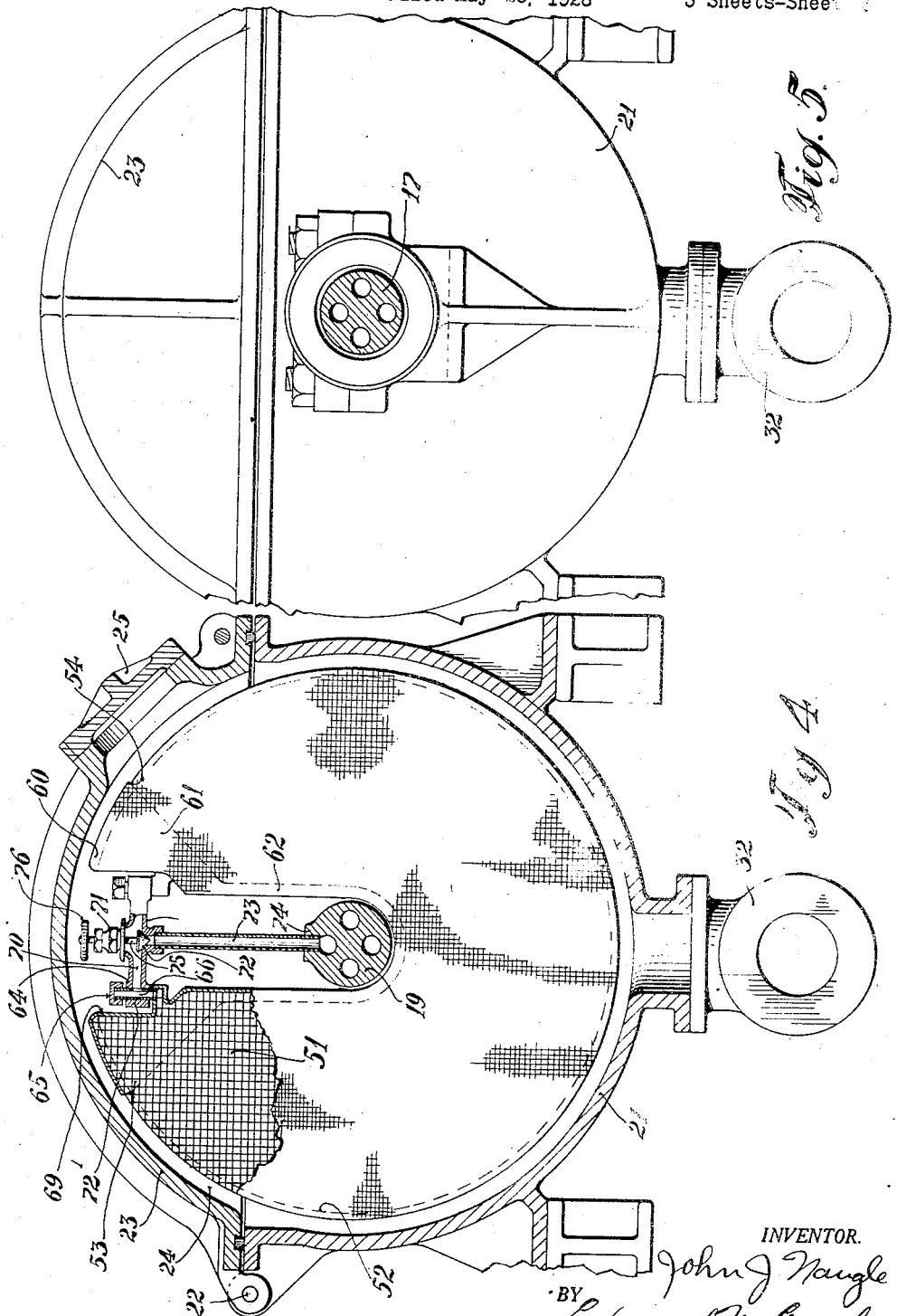
INVENTOR.
John J Naugle
BY
Edward M Evarts
his ATTORNEY.

Patented July 7, 1931

1,813,073

UNITED STATES PATENT OFFICE

JOHN J. NAUGLE, OF GREENWICH, CONNECTICUT

FILTERING MEANS

Application filed May 25, 1928. Serial No. 280,638.

My present invention relates to machines for filtering liquids, such as water for beverage purposes, sugar melts, syrups, molasses, vegetable and mineral oils, and other liquids, for the removal of solid impurities suspended therein, or for the dehydration of solid materials which it is desired to recover in a substantially pure dehydrated condition, such as suspensions of clays, dyes, and the like.

It is an object of the present invention to devise machines of the general character referred to which will be easy to manufacture, which may be readily standardized, and which will be easy to assemble, or to disassemble when repairs may become necessary. It is another object of the present invention to devise machines of the character specified which will be simple and efficient in operation, easy to maintain and operate, and little liable to get out of repair.

A further object of the present invention is to provide machines of the general character referred to which will be capable of a high rate of filtration, especially where it is desired to use such machines for dehydrating suspensions of clay and the like. Still another object of the present invention is to device a machine capable of yielding a filtrate of a high degree of purity from which in turn solid values may be recovered in a very pure state.

Another object of the present invention is to devise a machine which will enable a ready determination of which particular filtering member or members, if any, are defective and which will thus enable the ready and convenient location and removal of the particular offending member or members. It is a further object of the present invention to device a machine from which any defective filtering member or members may readily be removed without the necessity of interrupting the operation of the machine for any considerable length of time. The machine of the present invention may also, in one of its forms, make provision for cutting out or rendering inoperative such offending filtering member or members.

Still another object of the present invention is to provide a superior type of filtering leaf or element which is capable of a very high rate of filtration, which it shall be easy to insert and position within the machine, and which may, if desired, in case it becomes defective, be cut out or rendered inoperative without in any way affecting the operativeness of the remaining filtering elements with which the machine may be provided.

By means of the present invention also, an even cake or layer of deposit is obtainable which enables the filtering operation to be conducted in a uniform and readily controllable manner, a feature which is particularly advantageous where the machine is used to dehydrate suspensions of solid matter, such as clay or the like. The present invention also makes it possible to wash the machine quickly and thoroughly, and to remove the cake or layer of deposit in an efficient and expeditious manner.

By way of example I shall, in the accompanying specification, describe, and in the annexed drawings show, a preferred embodiment of the present invention. It is, however, to be understood that my invention is not limited to the specific embodiment thereof herein shown and described for purposes of illustration only.

Referring to the drawings, wherein I have illustrated the aforesaid illustrative embodiment of the present invention.

Figure 1a is a view, similar to Figure 1, of the other end of the machine, showing particularly the electric motor which may be used for driving the machine;

Figure 2 is a view, partly in longitudinal section and partly in elevation, of one of the channelled collecting members and associated plug cocks into which liquid from one half of the machine, in the example given, flows;

Figure 3 is an end view of the device shown in Figure 2;

Figure 4 is a cross section of the machine, adjacent the central portion thereof; and Figure 5 is an end view of the machine showing in section the hollow shaft which acts as a conduit.

Figure 1:
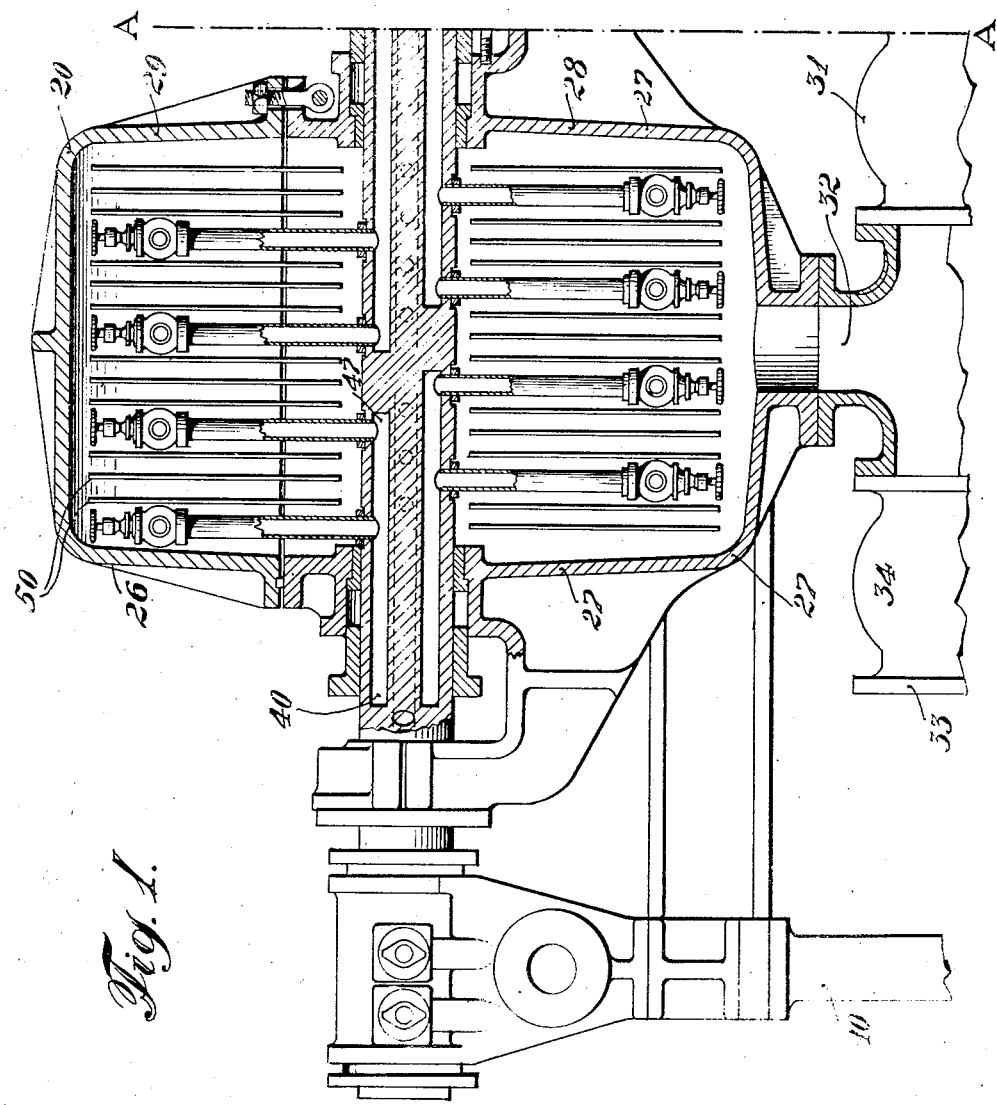
Figure 1 is a view in longitudinal section, partly in elevation, of one end of the machine, including the shell containing the filtering elements.

Referring to the aforesaid illustrative embodiment of the present invention, 10, 11 and 12 indicate the beams, shafts or standards constituting the support for the machine as a whole. Mounted on the horizontal beams or supports 13 and 14, carried by the standards 10, 11 and 12, is a platform 15 carrying an electric motor 16, or equivalent device, for driving the machine. The motor 16 or its equivalent is provided with the usual drive shaft 17 keyed, as at 18, to the main shaft 19 which carries the filtering elements and which rotates within a stationary shell or casing which will now be described in greater detail.

The shell or casing 20 is of the "clam shell" type, and comprises a lower substantially cylindrically shaped portion 21, to which is hinged, as at 22, an upper member 23. The upper member 23 is shaped so as to constitute a section of a cylinder, and the members 22 and 23 together form a substantially cylindrical chamber 24 within which the filtering elements 50 carried by the shaft 19 rotate. The upper section 23 of the casing 20 is provided with a closure 25 through which inspection may be made of the interior of the machine and, if desired, one or more of the filtering members rendered inoperative, should such member or members become defective and should it not be desired to replace the same.

The casing 20 has the usual substantially circular ends 26 and 27, each comprising a lower substantially circular member 28 and an upper segmental member 29, the members 28 and 29 together forming the substantially circular ends or end closures 26 and 27. At its lower portion, the casing 20 is provided with a feed inlet controlled by a valve 31, for the admission of liquid to be treated into the channel 32 leading to the chamber 24. At 33 I have provided a drainage outlet controlled by a valve 34 communicating with the channel 32 already referred to.

The hollow shaft 19 is provided with a plurality of channels or bores 40 whose inner ends are all closed. The shaft 19 is suitably mounted for rotation within the ball bearings 41 carried by brackets 42 which are in turn carried by the shell or casing 20. The shaft 19 is, in the specific example herein shown and described, provided with eight bores or channels 40, four at each end, the channels at one end being designated as 40a, 40b, 40c and 40d, and the channels at the other end being designated as 40e, 40f, 40g and 40h.

Of the four channels at each end of the shaft 19, the channel 40a (or 40e) is the shortest; the channel 40b (or 40f) is next in length; the channel 40c (or 40g) is next to the longest; and the channel 40d (or 40h) is the longest of all. This is for a purpose to be shortly described in great detail. As already stated, the inner ends of the bores or channels 40, generally designated by reference character 43, are closed, communicating only with the interior of the hollow filtering elements in the manner subsequently to be set forth. The outer ends of the bores or channels 40, on the other hand, are open, or in communication with the respective annular grooves or channels 44 of the channelled collecting members 45.

Carried by the hollow rotatable shaft 19 are a plurality of, herein shown as sixteen, hollow filtering elements 50 which will now be described in detail. Each filtering element (see Figure 4 of the drawings) comprises a foraminous member, such as a metal screen, 51 which is substantially circular, except that it is provided with a slot 52 extending inwardly from the periphery of the screen 51 to a point substantially adjacent the center of the screen. Surrounding the outer peripheral portion of the screen 51, so as to constitute, in effect, a metal selvage or binder for the same, is a clamping metal band 53 extending from one edge of the slot, around the periphery of the screen 51, to the other edge of the slot.

Surrounding the screen 51 and the selvage 53, is a bag or covering 54, which may be made of any suitable fabric, such as cotton cloth. It will be noted that the bag or covering 54 is slotted in a manner similar to the screen 51, so that the member 54 snugly covers and surrounds the screen 51 and the selvage 53. The manner in which the members 51, 53 and 54 are assembled in the formation of the filtering screen or element, forms no part of the present invention, and will in fact be obvious to those skilled in the art to which the present invention relates.

Within the slot 52 in the screen 51 and the covering 54, is located means by which any particular filtering element 50 is suitably supported and the interior of the same connected with the particular bore or channel of the rotatable shaft 19. In the specific embodiment herein shown and described, the preferred connection and supporting means comprises a yoke-shaped connecting member 60 provided with a plurality of substantially triangular pockets 61 into which the corners of the filtering screen 51 and the cover 54 fit.

Forming a continuation of the pockets 61 is a U-shaped metal selvage member 62 of channelled or U-shaped cross section, so as to contain the edges of the screen 51 and the cover 54 adjacent the slot 52. At the cutaway portions 63 of the connecting member 60, the latter is provided with a plurality of upstanding short tubes or nipples 64, the upper ends of which are threaded to receive end caps or closures in the form of the screw caps 65.

The short tubes or nipples 64 are provided with openings 66 communicating with channels 70 in a substantially T-shaped connecting and supporting member 71. This member has two arms or branches 72 in which the respective channels 70, communicating with the interior of the tube 64 by way of the perforations 66, are provided. The cross arms or members 72 are attached to a vertical support in the form of a tube 73, the lower end 74 of which is threaded into or otherwise fastened in the hollow shaft 19, so as to communicate with the appropriate bore or channel 40, in this specific case the channel 40a.

By means of a valve 75, operable by a hand wheel 76, and cooperating with a seat 77 adjacent the point where the vertical tube 73 communicates with the channels 70 of the cross members 72, communication between the interior of the hollow filtering element 50 and the channel or bore 40 of the hollow shaft 19, may be opened, or closed, as desired, thus cutting out and rendering inoperative, or cutting in and rendering operative, the particular filtering element 40.

It will be noted that the four channels or bores at each end of the shaft 19 are so arranged that there is one channel or bore in each quadrant of the shaft. It will further be noted that two filtering elements 50 communicate with each bore or channel 40. It will also be noted that by the arrangement of channels and filtering elements shown, the tubes 73 communicating with the respective bores or channels are separated from each other by an angle of approximately 90°. This results in an even distribution of the weight of the supporting and conducting members, and of the filtering elements carried by the same. For example, two filtering elements 50a are connected with the channel 40a; two filtering elements 50b are connected with the channel 40b; two filtering elements 50c are connected with the channel 40c; two filtering elements 50d are connected with the channel 40d; two filtering elements 50e are connected with the channel 40e; two filtering elements 50f are connected with the channel 40f; two filtering elements 50g are connected with the channel 40g; two filtering elements 50h are connected with the channel 40h.

Referring now to the channelled collecting members 45, briefly mentioned above, each each channelled collecting member 45, in the example given, is provided with four substantially annular collecting grooves or channels 80. At one end of the machine, the collecting member 45 is provided with the collecting grooves or channels 80a, 80b, 80c, and 80d, communicating with the respective bores or channels 40a, 40b, 40c, and 40d, of the hollow shaft 19; while at the other end of the machine, the channelled collecting member 45 is provided with the four collecting grooves or channels 80e, 80f, 80g, and 80h, communicating with the respective bores or channels 40e, 40f, 40g, and 40h, of the hollow shaft 19. Stuffing boxes 81 may be provided, as shown; and false stuffing boxes 82 may also be provided to assist in the assembling of the machine and of the filtering elements within the same.

Since, in the example here given, it is desired to provide a machine in which it will be possible to determine which set of the eight sets of two filtering elements each, contains a defective filtering member or members, without the necessity of dismantling the machine, I provide each of the collecting members 45 with the four plug cocks 83, one plug cock communicating with one of the annular grooves or channels in the respective collecting member 45.

As more clearly shown in Figures 2 and 3 of the drawing, there will be four plug cocks for each collecting member 45. The plug cocks are preferably staggered, as shown. The channels of the channelled members 45, may communicate, as shown more clearly in Figure 1b of the drawing, with a manifold 84 provided with a conduit or connection 85 constituting a filtrate outlet or wash water inlet, as the case may be.

Communication of any one or more of the annular channels 80 of the collecting members 45 with the respective manifolds 84, and thus with the outlets 85, is controlled by the plug cocks 83. In the position of the plug cocks shown more clearly in section in Figure 3 of the drawings, the particular channel 80 controlled by the particular plug cock, communicates with an outlet 86 which may lead to a glass gage or other indicating device for determining if the particular two filtering elements feeding the particular channel controlled by the particular plug cock, are in proper working condition. Or, if desired, the outlet 86 may be used for an outlet for filtrate, where it is desired that the same shall flow directly through the air into an open tank, without the necessity of the filtrate passing through the manifolds 84 and the outlets 85.

Where it is desired, however, that the filtrate shall pass directly into the manifolds 84, and thus out of the machine through the outlets 85, the plug cocks 83 may be turned to bring about this desired result, as by turning the plug cocks through an angle of 180° from the position shown in Figure 3 of the drawings. On the other hand, where it is desired, as by reason of a test showing that one or both of a particular pair of filtering elements are defective, to entirely cut off and render inoperative the particular pair of filtering elements, the particular plug cock 83 controlling the discharge from such filtering elements may be turned through an angle of 90° from the position shown in Figure 3 of the drawings, to accomplish the desired purpose.

The operation of the machine described above and the advantages resulting from such operation may be briefly summarized as follows: Assuming that the machine has been assembled so as to have the form and arrangement of parts illustrated in the various figures of the drawings, and described in detail above, and assuming that the drainage outlet 33 has been closed by the valve 34, and the feed inlet 30 has been opened by means of the valve 31, liquid to be purified, such as sugar melt, syrup, molasses, vegetable or mineral oil, or other liquid containing impurities which it is desired to remove, or a liquid containing solids in suspension which it is desired to recover, passes into the chamber 21 within the casing 20 through the inlet port or channel 32 in the bottom of the machine.

Assuming now that all of the valves 75 are open, and that the plug cocks 83 are so disposed as to lead all the filtrate into the manifolds 85, and thus out of the machine into any suitable storage tanks or other appropriate receptacles by way of the outlets 85, feed liquid will surround the hollow filtering elements 50 mounted on the shaft 19.

The shaft 19 is put into rotation by means of the electric motor 16, or other suitable driving means, at a speed which may be as low as three, or as high as fifteen or twenty, revolutions per minute. The speed of rotation of the shaft 19 carrying the filtering elements 50 will depend upon the character of fluid being treated and the rapidity with which the cake or layer of deposit will form upon the filtering elements. The approximate speed of rotation specified has been found to be desirable in connection with ordinary fluids intended to be purified by being treated in the machine, such as sugar melts, for example.

Filtrate will now pass into the interior of the hollow filtering elements 50. From the interior of the hollow filtering elements the filterate will pass into the appropriate bores or channels 40, one such bore or channel, in the example given, communicating with one pair of filtering elements. From this point the filtrate passes to the appropriate annular groove or channel 80 in the appropriate collecting member 45. From the grooves or channels 80, the filtrate passes into the manifolds 84 and thus out of the machine by way of the outlets 85.

This action continues until such a thickness of cake or layer of deposit has formed on the filtering elements 50 as makes it inadvisable to operate the machine further without the removal of such cake or layer of deposit. Thereupon the feed inlet 30 for further liquid to be purified, is closed by means of the valve 31, and the drainage outlet 33 is opened by the suitable operation of the valve 34. Wash water now enters the interior of the filtering elements 50 by way of the ports 85, the manifolds 84, channels 44, bores 40.

Under the pressure of the wash water within the interior of the filtering elements 50, the cake or layer of deposit is removed from the cloth or equivalent coverings 54, and the elements themselves thoroughly cleaned. The cleaning action is further facilitated by rapidly spinning or rotating the shaft 19 carrying the filtering elements 50. For this purpose the shaft may be rotated as rapidly as five hundred up to fifteen hundred revolutions per minute. The combined cleaning action due to the internal pressure of the wash water and the centrifugal action resulting from the rapid rotation of the filtering elements on the shaft 19 results in thoroughly cleansing the machine and the filtering elements thereof, the dislodged cake and the wash waters passing out of the machine through the drainage outlet 33 controlled by the valve 34. Any sugar values present in the wash waters may readily be recovered and the solids may be thrown away, or utilized for any desired purpose.

Should it develop during the course of the operation of the machine that there is a defective filtering element or elements somewhere in the machine, the plug cocks 83 may be manipulated to successively test the character of filtrate coming from each of the eight pairs of filtering elements in the device herein shown and described by way of example. When it has been determined which particular pair of filtering elements contains the defective member, the plug cock may be manipulated either to cut off this pair of filtering elements, or to lead the filtrate from this pair of elements to some other container than that to which the filtrate from the perfectly functioning filtering elements is led. Thereupon the rotation of the filtering elements is momentarily stopped, the top of the casing is raised, or the closure 25 opened, as desired, and the valves 75 of the particular pair of filtering elements found to contain the offending member or members are manipulated to determine which member of the pair is defective.

Upon determining which particular filtering member is defective, the same may be cut off or rendered inoperative by closing the valve 75. Or, if desired, the upper hinged portion 23 of the casing 20 may be unlocked and the shaft rotated until the slot 52 points downward. Prior to this, however, the screw caps 65 should have been removed to enable the offending filtering element to be removed so that it may be replaced. Thereupon, the defective filtering element 50 is removed, and may, if desired, be replaced with a new and perfect member by passing such a member 50, by means of the slot 52, over the shaft 19 so as to bring the short tubes or nipples 64 down through the openings 72' of the cross arms 72 of the combined supporting and connecting member 73. The shaft 19 is, now, again rotated to bring the slot into an upward position, in which position the screw members or caps 65 are screwed onto the threaded upper ends of the short tubes or nipples 66. By opening the valve 75, the new and perfect filtering element 50, now properly placed and in position on the combined supporting and connecting means 73, may be connected up with the system. If, meanwhile, the plug cock 83, controlling the pair of filtering elements 50, one of which has just been replaced by a new filtering element, has been in closed position, the same may now be manipulated into open position and the machine once more set in rotation to perform its work of filtration, purification, or dehydration, as the case may be.

The advantages of the construction described above, and the superiorities of the same in use, are numerous and of great practical importance and may be briefly enumerated as follows: The machine described above may be readily manufactured by methods that permit of ready shop standardization for quantity production. The machine may be readily assembled, and just as readily disassembled, should repairs become necessary.

The machine is, at the same time, simple and efficient in operation, and comparatively easy to maintain and to operate, being little liable to get out of repair. The machine also permits of a high rate of filtration, which is particularly desirable where the machine is to be used for dehydrating suspensions of clays, dyes and the like, containing large quantities of water. On the other hand, where the machine is to be used for purifying water for beverage purposes, or for filtering liquids, such as sugar melts, syrups, molasses, vegetable and mineral oils, and other liquids containing impurities in suspension which it is desired to remove, it yields a filtrate of a very high degree of purity, from which in turn solid values may be recovered in a very pure state commanding higher prices in the market than the ordinary solids of less purity obtainable by the use of less efficient filtering machines.

One of the most important advantages of the present invention results from the new and superior type of filtering leaf or element which may be embodied in the machine described in detail above. The construction of the new filtering leaf or element makes it possible readily to determine which filtering element of a pair or group of filtering elements is defective. The machine itself renders possible the speedy determination of which particular pair or set of filtering elements contains the offending member. At the same time, the filtering elements themselves are so constructed as to permit of their being readily removed or replaced, as desired, without the necessity of interrupting the operation of the machine for more than a very brief period.

Another advantage of the machine described herein is that it renders possible cutting out any particular pair or set of filtering elements found to contain an offending or defective member, without the necessity of removing such offending member. The filtering leaf itself is provided with means for cutting the same out, or rendering the same inoperative, if so desired, without in any way affecting the operativeness of the remaining filtering elements with which the machine may be provided.

By means of the machine described above, moreover, an even cake or layer of deposit is obtainable which enables the filtering operation to be conducted in a uniform and readily controllable manner. This is of particular importance where the machine is to be used to dehydrate suspensions of solid matter, such as clay or the like. The present invention also makes it possible to wash the machine quickly and thoroughly, and to remove the cake or layer of deposit in an entirely efficient, expeditious and thoroughly satisfactory manner.

What I claim is:

1. Filtering means comprising a hollow filtering element slotted inwardly from the periphery thereof to a point located adjacent the center thereof, and means located within said slot and communicating with the interior of said filtering element at two points thereof on either side of said slot, for withdrawing filtrate from said filtering element.

2. In a filtering device, a hollow filtering element comprising a filter screen slotted inwardly from the periphery thereof to a point substantially at the center thereof, a similarly slotted cover of porous fabric enclosing said screen, a plurality of tubular connections each communicating with the interior of said hollow filtering element, and means comprising a T-connection located within the slotted portions of said screen and cover and communicating with the interior of said hollow filtering element by way of said tubular connections for withdrawing filtrate therefrom.

3. In a filtering device, a hollow filtering element comprising a substantially circular filter screen slotted inwardly from the periphery thereof to a point substantially at the center thereof, a similarly slotted cover of porous fabric enclosing said screen, a plurality of tubular connections each communicating with the interior of said hollow filtering element, and means comprising a T-connection located within the slotted portions of said screen and cover and communicating with the interior of said hollow filtering element by way of said tubular connections for withdrawing filtrate therefrom.

In testimony whereof I have signed my name to this specification this 14th day of May, 1928.

JOHN J. NAUGLE.